(12) United States Patent
Kabasawa

(10) Patent No.: US 6,466,791 B1
(45) Date of Patent: Oct. 15, 2002

(54) TRANSMISSION POWER CONTROL SYSTEM

(75) Inventor: Shizuko Kabasawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/493,621

(22) Filed: Jan. 28, 2000

(30) Foreign Application Priority Data

Jan. 29, 1999 (JP) ............................................ 11-022643

(51) Int. Cl.[7] ................................................. H04Q 7/20
(52) U.S. Cl. ........................ 455/442; 455/522; 370/331; 370/335
(58) Field of Search .......................... 455/522, 69, 436, 455/442; 370/331, 335, 342

(56) References Cited

U.S. PATENT DOCUMENTS

| | | | |
|---|---|---|---|
| 5,771,451 A | 6/1998 | Takai et al. ................ | 455/442 |
| 6,157,668 A | 12/2000 | Gilhousen et al. .......... | 375/130 |
| 6,307,849 B1 * | 10/2001 | Tiedemann ................. | 370/335 |

FOREIGN PATENT DOCUMENTS

| | | |
|---|---|---|
| JP | 8-116306 | 5/1996 |
| JP | 9-74378 | 3/1997 |
| JP | 9-507115 | 7/1997 |

* cited by examiner

*Primary Examiner*—Lee Nguyen
(74) *Attorney, Agent, or Firm*—Foley & Lardner

(57) ABSTRACT

A transmission power control system for controlling, with a mobile station and two or more base stations simultaneously connectable to the mobile station base stations and transmission power from the base stations to the mobile station, including a control device for determining on a base station to be handed off based on information about a transmission strength of a pilot signal which each of the base stations transmits to the mobile station and information about strength of the pilot signal received at the mobile station which is transmitted by the base station to control transmission power before and after handoff.

8 Claims, 2 Drawing Sheets

TRANSMISSION POWER CONTROL SYSTEM

BACKGROUND OF THE INVENTION

1. Field of the Invention

The present invention relates to a system for controlling transmission power from a base station in mobile communication and, more particularly, to a transmission power control system for controlling transmission power from a base station according to the change of a connection between a mobile station and a communication network in code division multiple access (CDMA) or other system mobile communication.

2. Description of the Related Art

In conventional time-division multiple access (TDMA) and analog mobile communication systems, a connection is established between a network and a mobile station through strictly one channel of one base station.

It is therefore possible to control transmission power of a channel connected by a base station itself based on a value of transmission power from the base station which is measured at and reported by a mobile station.

In addition, the conventional systems require transmission power control only for enabling a base station to maintain a connection with a mobile station and have no system problem as long as the control produces no effect on a reuse area of the same frequency.

Unlike conventional TDMA and analog systems, a code division multiple access (CDMA) mobile communication system has a connection mode called soft handoff (soft hand-over) in which a plurality of base stations and a plurality of channels connect with one mobile station.

In this soft handoff, to one mobile station coming to cell boundaries, an identification signal of a base station is sent out from a plurality of base stations. Then, when the mobile station fully enters any of the cells, switching of base stations (handoff or hand-over) is conducted.

A plurality of channels should therefore conduct transmission power control simultaneously. In addition, since a connection mode is changed every moment due to moving of a mobile station, control responsive to the change is required.

Moreover, a CDMA mobile communication system employs the same frequency for adjacent cells. No transmission power control, therefore, causes an interference wave to adjacent cells to reduce a traffic accommodation capacity of a cell and a traffic accommodation capacity of the system accordingly.

SUMMARY OF THE INVENTION

A first object of the present invention is to control transmission power from a base station at every call according to a connection state to improve a communication capacity in a CDMA mobile communication system.

Further and other objects, features and effects of the present invention will become apparent from detailed description in the following.

According to the first aspect of the invention, a transmission power control system for controlling, with a mobile station and two or more base stations simultaneously connectable to the mobile station, base stations and transmission power from the base stations to the mobile station, comprises a control means for determining on a base station to be handed off based on information about a transmission strength of a pilot signal which each of the base stations transmits to the mobile station and information about a strength of the pilot signal received at the mobile station which is transmitted by the base station to control transmission power before and after handoff.

In the preferred construction, the control means comprises connection information holding means for grasping a base station being currently connected with the mobile station and storing the base station as connection information, control desired value obtaining means for obtaining information of a desired value of transmission power of the base station being currently connected, pilot signal obtaining means for obtaining transmission strength information of current the pilot signal of a base station which can be handed off by the mobile station, and simultaneous communication means for simultaneously transmitting handoff information which is information about handoff between the mobile station and each the base station to the currently connected base station and the base station which can be handed off.

In another preferred construction, the control means comprises connection information holding means for grasping a base station being currently connected with the mobile station and storing the base station as connection information, control desired value obtaining means for obtaining information of a desired value of transmission power of the base station being currently connected, pilot signal obtaining means for obtaining transmission strength information of current the pilot signal of a base station which can be handed off by the mobile station, and simultaneous communication means for simultaneously transmitting handoff information which is information about handoff between the mobile station and each the base station to the currently connected base station and the base station which can be handed off, the simultaneous communication means transmitting communication channel number information which is information about the number of the base stations communicable with the mobile station before and after handoff as included in the handoff information.

According to the second aspect of the invention, a transmission power controlling method of controlling, with a mobile station and two or more base stations simultaneously connectable to the mobile station, base stations and transmission power from the base stations to the mobile station, comprising the steps of determining on a base station to be handed off based on information about a transmission strength of a pilot signal which each of the base stations transmits to the mobile station and information about a strength of the pilot signal received at the mobile station which is transmitted by the base station, and controlling transmission power before and after handoff.

In the preferred construction, the transmission power controlling method further comprising a connection information holding step of grasping a base station being currently connected with the mobile station and storing the base station as connection information, a control desired value obtaining step of obtaining information of a desired value of transmission power of the base station being currently connected, a pilot signal obtaining step of obtaining information about a transmission strength of current the pilot signal of a base station which can be handed off by the mobile station, and a simultaneous communication step of simultaneously transmitting handoff information which is information about handoff between the mobile station and each the base station to the currently connected base station and the base station which can be handed off.

In another preferred construction, the transmission power controlling method further comprising a connection information holding step of grasping a base station being currently connected with the mobile station and storing the base station as connection information, a control desired value obtaining step of obtaining information of a desired value of transmission power of the base station being currently connected, a pilot signal obtaining step of obtaining information about a transmission strength of current the pilot signal of a base station which can be handed off by the mobile station, and a simultaneous communication step of simultaneously transmitting handoff information which is information about handoff between the mobile station and each the base station to the currently connected base station and the base station which can be handed off, wherein at the simultaneous communication step, communication channel number information which is information about the number of the base stations communicable with the mobile station before and after handoff is transmitted as included in the handoff information.

According to the third aspect of the invention, a computer readable memory which records a transmission power control program for controlling, with a mobile station and two or more base stations simultaneously connectable to the mobile station, base stations and transmission power from the base stations to the mobile station, the transmission power control program comprising the steps of determining on a base station to be handed off based on information about a transmission strength of a pilot signal which each of the base stations transmits to the mobile station and information about a strength of the pilot signal received at the mobile station which is transmitted by the base station, and controlling transmission power before and after handoff.

According to another aspect of the invention, a transmission power control system for controlling, with a mobile station and two or more base stations simultaneously connectable to the mobile station, base stations and transmission power from the base stations to the mobile station, comprises a controller which obtains information about a transmission strength of a pilot signal which each of the base stations transmits to the mobile station and information about a strength of the pilot signal received at the mobile station which is transmitted by the base station and determines on a base station to be handed off based on the transmission strength and the reception strength to control transmission power before and after handoff.

In the preferred construction, the controller comprises a connection information holding circuit which grasps a base station being currently connected with the mobile station and stores the base station as connection information, a control desired value obtaining circuit which obtains information of a desired value of transmission power of the base station being currently connected, a pilot signal obtaining circuit which obtains information about a transmission strength information of current the pilot signal of a base station which can be handed off by the mobile station, and a simultaneous communication circuit which simultaneously transmits handoff information which is information about handoff between the mobile station and each the base station to the currently connected base station and the base station which can be handed off.

In another preferred construction, the controller comprises a connection information holding circuit which grasps base station being currently connected with the mobile station and stores the base station as connection information, a control desired value obtaining circuit which obtains information of a desired value of transmission power of the base station being currently connected, a pilot signal obtaining circuit which obtains information about a transmission strength of current the pilot signal of a base station which can be handed off by the mobile station, and a simultaneous communication circuit which simultaneously transmits handoff information which is information about handoff between the mobile station and each the base station to the currently connected base station and the base station which can be handed off, the simultaneous communication circuit transmits communication channel number information which is information about the number of the base stations communicable with the mobile station before and after handoff as included in the handoff information.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
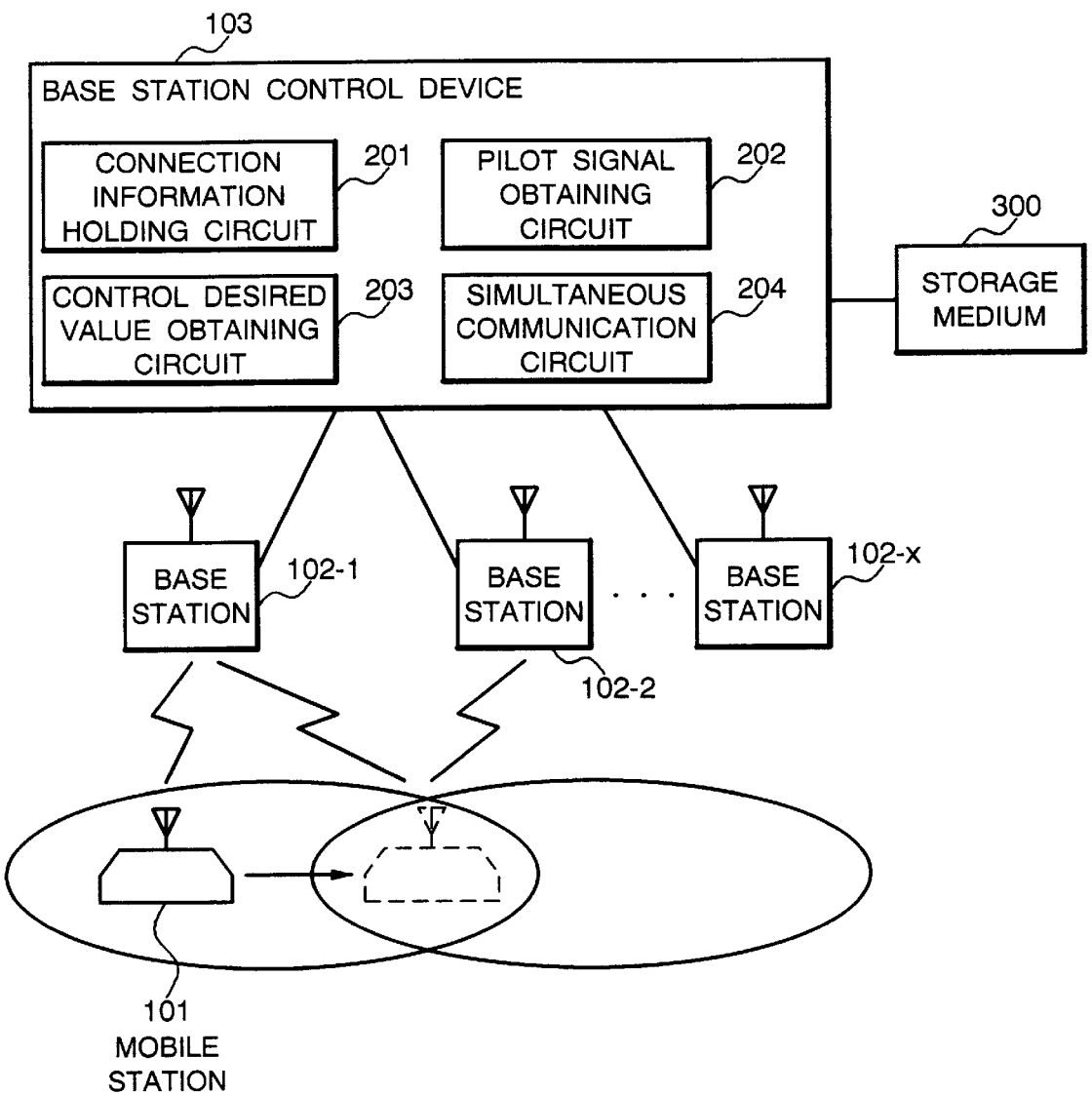
FIG. 1 is a block diagram of a transmission power control system according to one embodiment of the present invention.

FIG. 1 is a block diagram showing a transmission power control system according to one embodiment of the present invention.

As shown in FIG. 1, the transmission power control system of the present invention includes one mobile station 101, a plurality of base stations 102-1, 102-2, . . . , 102-x which conduct transmission to the mobile station 101, and a base station control device 103 connected to these base stations. Through the base station control device 103, control of transmission power from each of the base stations 102 to the mobile station 101 is executed.

With reference to FIG. 1, the mobile station 101 is currently moving within a communication area of the base station 102-1 to further move onto a point overlapping with a communication area of the base station 102-2.

The base station control device 103 determines on a base station 102 to be connected to the mobile station 101 and executes control of transmission power from the base station 102 to the mobile station 101 based on a report from the mobile station 101. For this purpose, the base station control device 103 includes a connection information holding circuit 201 for holding information regarding a connection between the mobile station 101 and the base station 102, a pilot signal obtaining circuit 202 for obtaining and holding a transmission strength of a pilot signal from the base station 102-2 to be additionally connected, a control desired value obtaining circuit 203 for obtaining and holding a desired value of latest transmission power control of the already connected base station 102-1, and a simultaneous communication circuit 204 for editing a signal based on these information and simultaneously transmitting the signal to all the base stations among base stations 102-1 and 102-2 communicable with the mobile station 101 as handoff information.

Each base station 102 transmits a pilot signal and when the mobile station 101 receives the pilot signal at a more than predetermined strength, the mobile station 101 determines that it enters an area communicable with the base station 102 which is currently transmitting the pilot signal. Also in this case, for notifying the base station side of this information, the mobile station 101 transmits a pilot strength measurement message signal and the base station 102 receives the signal. By this pilot strength measurement message signal, reception strength information as the information regarding a strength of the pilot signal received by the mobile station 101 is notified to the base station 102.

Upon receiving the pilot strength measurement message signal, each base station 102 notifies, to the base station control device 103, the reception strength information of the pilot signal received by the mobile station 101 and transmission strength information which is the information regarding a strength of the pilot signal transmitted by the base station 102 itself.

The base station control device 103 receives the above-described reception strength information and transmission strength information from each base station 102 communicable with this mobile station 101 and compares values of the reception strength information and the transmission strength information of each base station 102 to select a base station to be handed off. This selection makes the use of the fact that as a distance between the mobile station 101 and the base station 102 is increased to deteriorate reception sensitivity, a value of reception strength information will be further lower than a value of transmission strength information.

Selection of a base station 102 to be handed off is to select a base station 102 which is allowed to conduct the most excellent communication with the mobile station 101, that is, to select a base station 102 whose reception strength information indicating reception strength of a pilot signal received by the mobile station 101 satisfies a not less than predetermined strength and whose reception strength information has a value approximate to a value of transmission strength information.

Moreover, the base station control device 103 controls a strength of a radio wave transmitted by the base station 102 based on the values of this reception strength information and transmission strength information such that the mobile station 101 can receive communication from the base station 102 in good condition and that the communication will not hinder communication in adjacent cells. This control is realized by the control of power to be transmitted such that a strength of a communication radio wave received by the mobile station 101 satisfies a value within a predetermined range.

Figure 2:
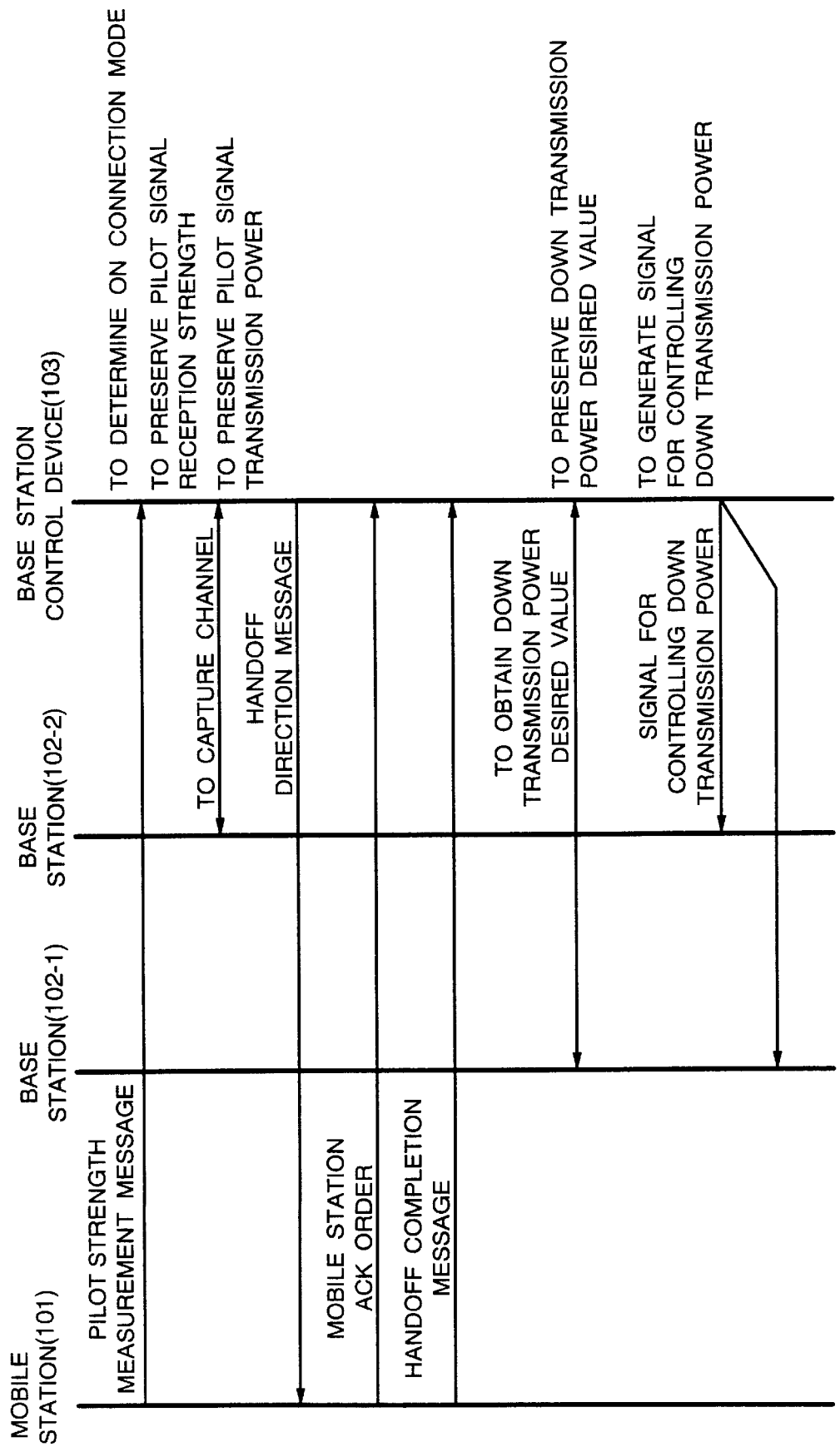
FIG. 2 is a sequence diagram for use in explaining operation of the transmission power control system according to one embodiment of the present invention.

FIG. 2 is a sequence diagram for use in explaining operation of the transmission power control system of the present invention. Here, the base station control device 103 first considers operation to be conducted where the mobile station 101 comes near to the area of 102-2 from the area of 102-1 as illustrated in FIG. 1.

First, the mobile station 101 transmits to the base station 102-2, a report (pilot strength measurement message) that in addition to the base station 102-1, a pilot signal reception strength from the base station 102-2 allows a connection.

At this time, the base station control device 103 determines on and records the addition of the connection between the base station 102-2 and the mobile station 101 by means of the connection information holding circuit 201 based on the notification from the base station 102-2, as well as recording the reported values of strengths of pilot signals of the base stations 102-1 and 102-2 received at the mobile station.

Next, the base station control device 103 instructs the base station 102-2 whose additional connection is determined to secure a channel for the mobile station 101 and obtains and preserves a transmission strength of the pilot signal of the base station 102-2 by means of the pilot signal obtaining circuit 202.

The base station control device 103 transmits, to the mobile station 101, a handoff direction message signal which instructs on the connection with both the base station 102-1 and the base station 102-2, and receives a handoff completion message signal as a handoff completion response from the mobile station 101. Then, by means of the control desired value obtaining circuit 203, the device 103 requests the base station 102-1 which has already conducted the connection and power control to obtain a latest desired value of power control (or a current value of power control) and preserves the result.

Then, based on the information obtained and recorded so far by each of the connection information holding circuit 201, the pilot signal obtaining circuit 202 and the control desired value obtaining circuit 203, the base station control device 103 determines whether handoff is to be executed and conducts handoff when necessary. Here, the base station control device 103 also controls power to be transmitted such that a strength of a communication radio wave received by the mobile station 101 has a value within a predetermined range.

In addition, by means of the simultaneous communication circuit 204, the device 103 simultaneously transmits these information as handoff information to all the base stations among the base stations 102-1 and 102-2 communicable with the mobile station 101.

The handoff information is here transmitted by the simultaneous communication circuit 204, including information of the number "2" of the base stations 102 which can be handed off by the mobile station 101 (i.e. two stations of the base stations 102-1 and 102-2).

The above-described embodiment of the present invention is applicable to various CDMA mobile communication systems including TIA (Telecommunications Industry Association) IS-95.

The base station control device in the transmission power control system of the present invention has its remaining functions implemented not only as hardware but also by loading of a computer program having the respective functions into a memory of a computer processing device. The computer program is stored in a storage medium 300 such as a magnetic disk and a semiconductor memory. Then, the program is loaded into the computer processing device from the storage medium 300 to control operation of the computer processing device, thereby realizing the above-described functions.

Although the present invention has been described with respect to the preferred mode of realization and embodiment in the foregoing, the present invention is not necessarily limited to the above-described realization mode and embodiment but embodied as variations within the scope of its technical idea.

According to the present invention described above, signals can be simultaneously transmitted to all the base stations connected according to the change of a base station connection mode, the start of transmission power control in a new connection mode can be simultaneously controlled at every call at all the base stations connected.

Moreover, according to the present invention, control of transmission power from a base station according to a connection mode enables interference between calls during speech to be reduced to ensure speech quality, as well as increasing a speech capacity.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A transmission power control system for controlling, with a mobile station and two or more base stations simultaneously connectable to said mobile station, base stations and transmission power from said base stations to said mobile station, comprising:

a control means for determining on a base station to be handed off based on information about a transmission strength of a pilot signal which each of said base stations transmits to said mobile station and information about a strength of said pilot signal received at said mobile station which is transmitted by said base station to control transmission power before and after handoff, wherein said control means comprises
connecting information holding means for grasping a base station being currently connected with said mobile station and storing the base station as connection information,
control desired value obtaining means for obtaining information of a desired value of transmission power of said base station being currently connected,
pilot signal obtaining means for obtaining transmission strength information of current said pilot signal of a base station which can be handed off by said mobile station, and
simultaneous communication means for simultaneously transmitting handoff information which is information about handoff between said mobile station and each said base station to said currently connected base station and said base station which can be handed off.

2. The transmission power control system as set forth in claim 1, wherein said simultaneous communication means transmits communication channel number information which is information about the number of said base stations communicable with said mobile station before and after handoff as included in said handoff information.

3. A transmission power controlling method of controlling, with a mobile station and two or more base stations simultaneously connectable to said mobile station, base stations and transmission power from said base stations to said mobile station, comprising the steps of:

determining on a base station to be handed off based on information about a transmission strength of a pilot signal which each of said base stations transmits to said mobile station and information about a strength of said pilot signal received at said mobile station which is transmitted by said base station,
controlling transmission power before and after handoff,
grasping a base station being currently connected with said mobile station and storing the base station as connection information,
obtaining information of a desired value of transmission power of said base station being currently connected,
obtaining information about a transmission strength of current said pilot signal of a base station which can be handed off by said mobile station, and
simultaneously transmitting handoff information which is information about handoff between said mobile station and each said base station to said currently connecting base station and said base station which can be handed off.

4. The transmission power controlling method as set forth in claim 3, wherein at said step of simultaneously transmitting handoff information, communication channel number information which is information about the number of said base stations communicable with said mobile station before and after handoff is transmitted as included in said handoff information.

5. A computer readable memory which records a transmission power control program for controlling, with a mobile station and two or more base stations simultaneously connectable to said mobile station, base stations and transmission power from said base stations to said mobile station, said transmission power control program comprising the steps of:

determining on a base station to be handed off based on information about a transmission strength of a pilot signal which each of said base stations transmits to said mobile station and information about a strength of said pilot signal received at said mobile station which is transmitted by said base station,
controlling transmission power before and after handoff,
grasping a base station being currently connected with said mobile station and storing the base station as connection information,
obtaining information of a desired value of transmission power of said base station being currently connected,
obtaining information about a transmission strength of current said pilot signal of a base station which can be handed off by said mobile station, and simultaneously transmitting handoff information which is information about handoff between said mobile station and each said base station to said currently connected base station and said base station which can be handed off.

6. The computer readable memory as set forth in claim 5, wherein at said step of simultaneously transmitting handoff information, communication channel number information which is information about the number of said base stations communicable with said mobile station before and after handoff is transmitted as included in said handoff information.

7. A transmission power control system with a mobile station and two or more base stations simultaneously connectable to said mobile station, base stations and transmission power from said base stations to said mobile station, comprising:

a controller which obtains information about a transmission strength of a pilot signal which each of said base stations transmits to said mobile station and information about a strength of said pilot signal received at said mobile station which is transmitted by said base station and determines on a base station to be handed off based on said transmission strength and said reception strength to control transmission power before and after handoff, wherein said controller comprises:

a connection information holding circuit which grasps a base station being currently connected with said mobile station and stores the base station as connection information, a control desired value obtaining circuit which obtains information of a desired value of transmission power of said base station being currently connected, a pilot signal obtaining circuit which obtains information about a transmission strength information of current said pilot signal of a base station which can be handed off by said mobile station, and a simultaneous communication circuit which simultaneously transmits handoff information which is information about handoff between said mobile station and each said base station to said currently connected base station and said base station which can be handed off.

8. The transmission power control system as set forth in claim 7, wherein said simultaneous communication circuit transmits communication channel number information which is information about the number of said base stations communicable with said mobile station before and after handoff as included in said handoff information.

* * * * *